J. R. LOWRY.
DIFFERENTIAL FOR SELF PROPELLING VEHICLES.
APPLICATION FILED JULY 5, 1917.
1,336,643.
Patented Apr. 13, 1920.
2 SHEETS—SHEET 1.
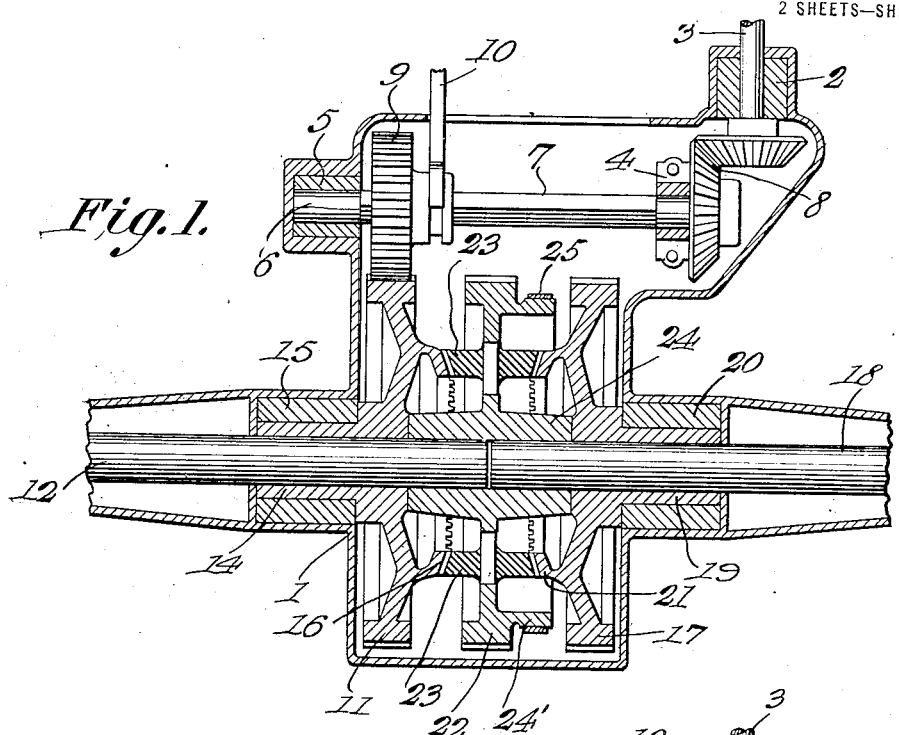
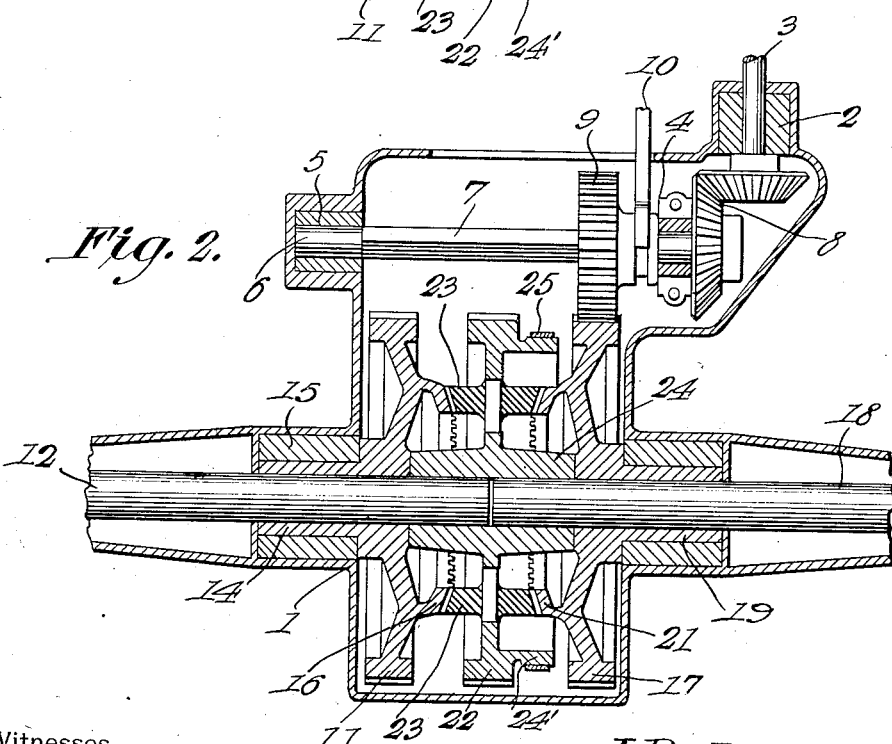
Witnesses
J. R. Lowry Inventor
by
Attorneys J. R. LOWRY.
DIFFERENTIAL FOR SELF PROPELLING VEHICLES.
APPLICATION FILED JULY 5, 1917.
1,336,643.
Patented Apr. 13, 1920.
2 SHEETS—SHEET 2.
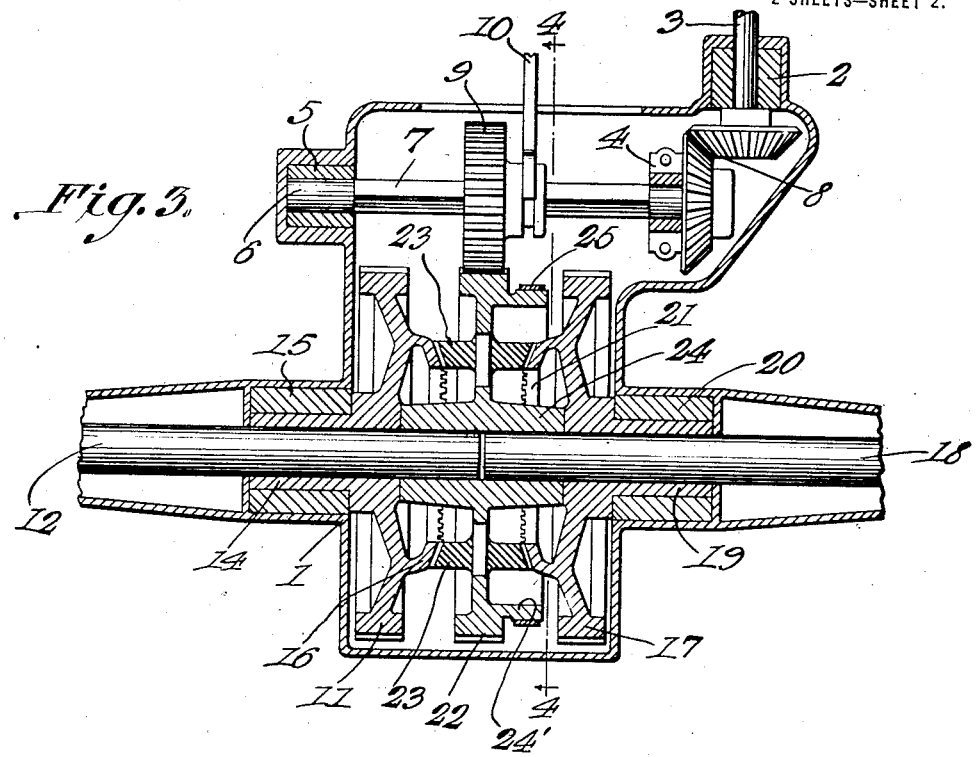
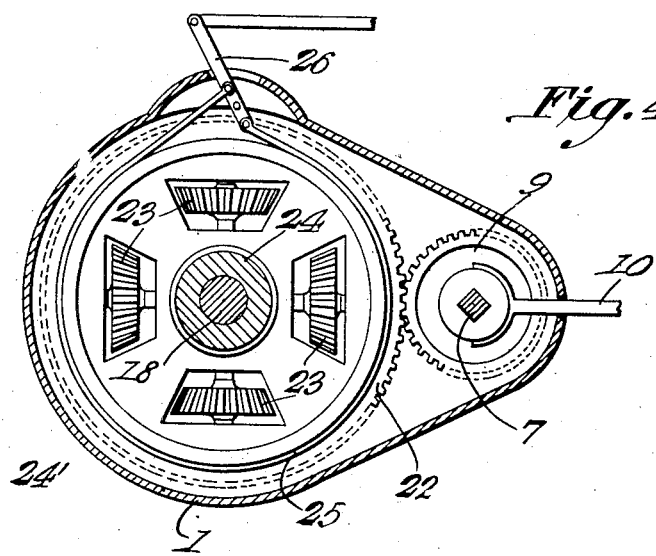
Witnesses
J. R. Lowry Inventor
by _____ Attorneys

UNITED STATES PATENT OFFICE.

JESSE R. LOWRY, OF ST. JOSEPH, MISSOURI.

DIFFERENTIAL FOR SELF-PROPELLING VEHICLES.

1,336,643.  Specification of Letters Patent.  Patented Apr. 13, 1920.

Application filed July 5, 1917. Serial No. 178,798.

*To all whom it may concern:*

Be it known that I, JESSE R. LOWRY, a citizen of the United States, residing at St. Joseph, in the county of Buchanan and State of Missouri, have invented a new and useful Differential for Self-Propelling Vehicles, of which the following is a specification.

The device forming the subject matter of this application is a differential adapted for use on vehicles, tractors and the like, and the invention aims to provide novel means whereby rotation may be imparted directly to either of the wheels of the vehicle, to the exclusion of the other wheel.

Another object of the invention is to provide novel means whereby an equal driving force may be applied to both wheels of the vehicle.

Another object of the invention is to provide novel means whereby one wheel of the vehicle may be rotated in one direction, the other wheel of the vehicle being rotated in a reverse direction.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figures 1, 2 and 3 are sectional views, showing the driving pinion coupled up with different elements of the differential mechanism proper; and Fig. 4 is a section taken on the line 4—4 of Fig. 3.

The numeral 1 denotes a supporting structure in the form of a casing, carrying a bearing 2. A drive shaft 3 is journaled in the bearing 2. The casing 1 carries bearings 4 and 5 in which is journaled an auxiliary shaft 6, disposed at right angles to the drive shaft 3. The auxiliary shaft 6 is of rectangular configuration, in its intermediate portion, as shown at 7, or is otherwise constructed, so that a pinion 9 may rotate with the auxiliary shaft 6, it being possible to slide the pinion 9 longitudinally of the shaft 6. The auxiliary shaft 6 is operatively connected with the drive shaft 3 in any suitable way, intermeshing beveled pinions 8 being employed for the purpose in the present embodiment of the invention. The numeral 10 denotes any suitable means for shifting the pinion 9 longitudinally of the part 7 of the shaft 6.

At 11 there appears a gear wheel including a hub 14 journaled in a bearing 15 carried by the casing 1. The bearing 15 may be of any desired form. The gear wheel 11 is secured to an axle 12 and is provided upon its inner side with a lateral beveled gear 16. The numeral 17 denotes a gear wheel disposed parallel to the gear wheel 11. The gear wheel 17 has a hub 19 journaled in a bearing 20 in the casing 1. The gear wheel 17 is secured to an axle 18 and is provided upon its inner side with a lateral beveled gear 21.

The numeral 22 denotes an intermediate gear wheel located between the gear wheels 17 and 11, the gear wheel 22 having a hub 24 in which the inner ends of the axles 12 and 18 are rotatably received. Beveled pinions 23 are journaled in the gear wheel 22 and mesh into the beveled gear 21 of the wheel 17, and into the beveled gear 16 of the wheel 11. The intermediate gear wheel 22 is provided at one side with a drum 24 engaged by a brake strap 25 operated by any suitable means indicated at 26.

When, as shown in Fig. 3, the pinion 9 is in mesh with the gear wheel 22, motion is transmitted from the drive shaft 3 by way of the beveled pinions 8 to the shaft 6, and thence by way of the pinion 9 to the gear wheel 22. The beveled pinions 23, acting as fixed elements, rotate the shaft 18 by means of the lateral beveled gear 21 and the gear wheel 17, and rotate the shaft 12 by way of the lateral beveled gear 16 and the gear wheel 11, the axles 18 and 12 being rotated at a uniform speed, and it being possible for either of the axles 12 or 18 to run ahead of the other, after the manner of an ordinary differential.

As shown in Fig. 1, the pinion 9 may be shifted into engagement with the gear wheel 11, and then the axle 12 will be rotated, no direct driving force being imparted to the axle 18. Similarly, as shown in Fig. 2, the pinion 9 may be shifted into engagement with the gear wheel 17. Then the axle 18 will be rotated, no direct driving effort being imparted to the axle 12, to rotate the lever.

While the pinion 9 is in mesh with the gear wheel 11, as shown in Fig. 1, or while the pinion 9 is in mesh with the gear wheel 17 as shown in Fig. 2, the rotation of the intermediate gear wheel 22 may be impeded or stopped by applying the brake 25 to the drum 24. Then, the beveled pinions 23 which are carried by the intermediate gear 22 will rotate, and the gear wheels 11 and 17, and consequently the shafts 12 and 18, will be forcibly rotated in opposite directions.

From the foregoing it will be obvious that all of the power may be applied to one wheel, driving it forwardly or backwardly at the will of an operator, and causing the vehicle to pivot on the idle wheel. One ground wheel may be driven forwardly and the other ground wheel may be driven backwardly, causing the vehicle to pivot about a point lying near the longitudinal center of the vehicle. All of the power may be applied to one wheel, and this is advantageous under many conditions, for instance, when the other wheel does not have a strong hold upon the ground. In addition to the foregoing, it will be observed that when the parts are arranged as shown in Fig. 3, both of the ground wheels of the vehicle may be driven positively at the same speed in the same direction, it being possible for one ground wheel to run ahead of the other, as is the case in an ordinary differential.

It will be obvious that, when the parts are arranged as shown in Fig. 3, the brake 25 may be applied to the brake drum 24, thereby making a giving action on both of the axles 12 and 18.

Having thus described the invention, what is claimed is:—

In a device of the class described, a casing; alined shafts journaled therein; outer gear wheels secured to the shafts and having side gears; an intermediate gear wheel journaled on the inner ends of the shafts between the outer gear wheels and carrying a laterally projecting drum; pinions journaled on the intermediate gear wheel and coöperating with the side gears to form a differential; a second shaft journaled in the casing and disposed parallel to the first specified shafts; a pinion rotatable with the second shaft and slidable therealong into engagement with the peripheries of any of the gear wheels; means for sliding the pinion on the second shaft; a lever fulcrumed on the casing; a brake strap engaging the drum and operated by the lever; and means for rotating the second shaft.

In testimony that I claim the foregoing as my own, I have hereto affixed my signature in the presence of two witnesses.

JESSE R. LOWRY.

Witnesses:
S. J. McNAUGHTON,
GEO. VAN HOOK.